(12) United States Patent
Williams et al.

(10) Patent No.: US 9,398,091 B2
(45) Date of Patent: *Jul. 19, 2016

(54) METHODS FOR TRANSPORTING DIGITAL MEDIA

(71) Applicant: Audinate Pty Limited, Ultimo, New South Wales (AU)

(72) Inventors: Aidan Williams, Chifley (AU); Varuni Witana, Ultimo (AU)

(73) Assignee: Audinate Pty Limited, Ultimo, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,953

(22) Filed: Mar. 3, 2015

(65) Prior Publication Data

US 2015/0180974 A1    Jun. 25, 2015

Related U.S. Application Data

(63) Continuation of application No. 13/907,171, filed on May 31, 2013, now Pat. No. 9,003,009, which is a continuation of application No. 13/193,283, filed on Jul. 28, 2011, now Pat. No. 8,478,856, which is a (Continued)

(30) Foreign Application Priority Data

Apr. 22, 2005  (AU) .................... 2005902065
Nov. 11, 2005  (AU) .................... 2005906272

(51) Int. Cl.
*H04L 29/08*       (2006.01)
*H04J 3/06*        (2006.01)

(Continued)

(52) U.S. Cl.
CPC ........... *H04L 67/1095* (2013.01); *H04J 3/0632* (2013.01); *H04L 29/06027* (2013.01);

(Continued)

(58) Field of Classification Search
CPC .... H04L 65/80; H04L 65/602; H04L 67/1095
USPC ................... 709/248, 231, 203, 209
See application file for complete search history.

(56) References Cited

U.S. PATENT DOCUMENTS 5,682,384 A   10/1997  Zarros
6,175,604 B1   1/2001  Noro et al.

(Continued)

FOREIGN PATENT DOCUMENTS

EP    1148687    10/2001
EP    1398931    3/2004

(Continued)

OTHER PUBLICATIONS

Blank et al. "An Internet Protocol (IP) Sound System," AES (Audio Engineering Society) 117th Convention San Francisco, CA (Oct. 2004).

(Continued)

*Primary Examiner* — Lashonda Jacobs
(74) *Attorney, Agent, or Firm* — Jones Day

(57) ABSTRACT

A networked system is provided for transporting digital media packets, such as audio and video. The network includes network devices interconnected to send and receive packets. Each network device can receive and transmit media signals from media devices. A master clock generates a system time signal that the network devices use, together with a network time protocol to generate a local clock signal synchronized to the system time signal for both rate and offset. The local clock signal governs both the rate and offset of the received or transmitted media signals. The system, which can be implemented using conventional network equipment enables media signals to be transported to meet quality and timing requirements for high quality audio and video reproduction.

16 Claims, 7 Drawing Sheets

Related U.S. Application Data continuation of application No. 12/662,994, filed on May 14, 2010, now Pat. No. 8,005,939, which is a continuation of application No. 11/409,190, filed on Apr. 21, 2006, now Pat. No. 7,747,725.

(51) Int. Cl.
  *H04L 29/06* (2006.01)
  *H04N 21/2381* (2011.01)
  *H04N 21/242* (2011.01)
  *H04N 21/43* (2011.01)

(52) U.S. Cl.
  CPC ............ *H04L29/0854* (2013.01); *H04L 65/60* (2013.01); *H04L 65/602* (2013.01); *H04L 65/80* (2013.01); *H04N 21/2381* (2013.01); *H04N 21/242* (2013.01); *H04N 21/4305* (2013.01); *H04J 3/0667* (2013.01)

(56) References Cited

U.S. PATENT DOCUMENTS

| | | | |
|---|---|---|---|
| 6,360,271 B1 * | 3/2002 | Schuster | H04J 3/0632 370/516 |
| 6,553,040 B2 | 4/2003 | Bernath et al. | |
| 6,611,537 B1 * | 8/2003 | Edens | H04L 12/2803 348/E7.05 |
| 6,661,804 B2 | 12/2003 | Fellman et al. | |
| 6,665,308 B1 | 12/2003 | Rakib et al. | |
| 6,675,314 B1 | 1/2004 | Yamada et al. | |
| 6,763,479 B1 | 7/2004 | Herbert | |
| 6,857,080 B1 | 2/2005 | Liang | |
| 7,000,031 B2 | 2/2006 | Fischer et al. | |
| 7,096,271 B1 * | 8/2006 | Omoigui | H04L 29/06027 709/217 |
| 7,136,388 B2 | 11/2006 | Friedrichs et al. | |
| 7,206,367 B1 * | 4/2007 | Moore | H04L 12/66 348/515 |
| 7,342,890 B1 | 3/2008 | Ferguson | |
| 7,551,647 B2 | 6/2009 | Fellman et al. | |
| 7,747,725 B2 | 6/2010 | Williams et al. | |
| 7,876,791 B2 | 1/2011 | Jung et al. | |
| 2001/0038674 A1 | 11/2001 | Trans | |
| 2002/0136198 A1 | 9/2002 | Findikli | |
| 2002/0150053 A1 | 10/2002 | Gray, III et al. | |
| 2003/0061369 A1 | 3/2003 | Aksu et al. | |
| 2003/0093703 A1 | 5/2003 | Oliver et al. | |
| 2003/0156603 A1 * | 8/2003 | Rakib | H03M 13/256 370/485 |
| 2003/0214936 A1 | 11/2003 | Goff | |
| 2003/0223409 A1 | 12/2003 | Wiebe | |
| 2003/0235216 A1 | 12/2003 | Gustin | |
| 2003/0236904 A1 | 12/2003 | Walpole et al. | |
| 2004/0001435 A1 * | 1/2004 | Wong | H04L 47/10 370/230 |
| 2004/0052209 A1 | 3/2004 | Ortiz | |
| 2004/0062278 A1 | 4/2004 | Hadzic et al. | |
| 2004/0100942 A1 | 5/2004 | Blank et al. | |
| 2004/0228367 A1 | 11/2004 | Mosig | |
| 2004/0234000 A1 | 11/2004 | Page | |
| 2004/0252400 A1 * | 12/2004 | Blank | G06F 17/30017 360/70 |
| 2005/0036512 A1 * | 2/2005 | Loukianov | H04J 3/0632 370/469 |
| 2005/0039065 A1 | 2/2005 | Cheung et al. | |
| 2005/0138459 A1 | 6/2005 | Yoon et al. | |
| 2005/0166135 A1 | 7/2005 | Burke et al. | |
| 2005/0201399 A1 | 9/2005 | Woodward et al. | |
| 2005/0288805 A1 | 12/2005 | Moore et al. | |
| 2006/0005099 A1 | 1/2006 | Strasman et al. | |
| 2006/0013262 A1 | 1/2006 | Downey et al. | |
| 2006/0013263 A1 | 1/2006 | Fellman | |
| 2006/0056432 A1 | 3/2006 | Azarov | |
| 2006/0072578 A1 | 4/2006 | Alfano | |
| 2006/0135258 A1 | 6/2006 | Maheshwari et al. | |
| 2006/0161835 A1 | 7/2006 | Panabaker et al. | |
| 2006/0280182 A1 | 12/2006 | Williams et al. | |
| 2007/0002886 A1 | 1/2007 | Lanigan et al. | |
| 2007/0005757 A1 | 1/2007 | Finger et al. | |
| 2007/0047590 A1 | 3/2007 | Curcio et al. | |
| 2007/0076727 A1 | 4/2007 | Shei | |
| 2007/0081562 A1 | 4/2007 | Ma | |
| 2007/0280125 A1 | 12/2007 | Sonnier | |
| 2008/0187282 A1 | 8/2008 | Brady et al. | |
| 2009/0274149 A1 | 11/2009 | Williams et al. | |
| 2010/0046383 A1 | 2/2010 | Williams et al. | |
| 2010/0161723 A1 | 6/2010 | Bryce et al. | |
| 2010/0228881 A1 | 9/2010 | Williams et al. | |
| 2010/0235486 A1 | 9/2010 | White et al. | |
| 2011/0002429 A1 | 1/2011 | Williams et al. | |

FOREIGN PATENT DOCUMENTS

| | | |
|---|---|---|
| WO | WO0072509 | 11/2000 |
| WO | WO2004008738 | 1/2004 |
| WO | WO2005006621 | 1/2005 |
| WO | WO2006057992 | 6/2006 |
| WO | WO2007131296 | 11/2007 |
| WO | WO2007131297 | 11/2007 |
| WO | WO2008138047 | 11/2008 |
| WO | WO2009105838 | 9/2009 |

OTHER PUBLICATIONS

David V. James; "Transmit State Machines"; IEEE 802.3 Residential Ethernet Study Group presentation; Sep. 21, 2005; pp. 107-121.

Felix F. Feng; "On the worst case, and pacing"; IEEE 802.3 Residential Ethernet Study Group presentation; Sep. 30, 2005; slides 1-17.

Geoffrey M. Garner; "Delay and Delay Variation Simulation Results for Additional Multi-hop Conventional Ethernet Cases with Bursting/Bunching"; IEEE 802.3 Residential Ethernet Study Group presentation; Sep. 14, 2005; slides 1-24.

Geoffrey M. Garner; "Delay and Delay Variation Simulation Results for Multi-hop Conventional Ethernet Cases with Bursting/Bunching"; IEEE 802.3 Residential Ethernet Study Group presentation; Aug. 19, 2005; slides 1-33.

John Nels Fuller; "Calculating the Delay Added by Qav Stream Queue"; IEEE 802.1, Qav presentation; Aug. 12, 2009; pp. 1-4.

Max Azarov; "On worst-case Latency for Ethernet networks and alternative shaping concept"; IEEE 802.3 Residential Ethernet Study Group Forum available at http://grouper.ieee.org/groups/802/3/re_study/email/msg00680.html; Sep. 26, 2005.

Max Azarov; "Worst-case Ethernet Network Latency for Shaped Sources"; IEEE 802.3 Residential Ethernet Study Group presentation; Oct. 7, 2005; pp. 1-12.

Max Azarov; "Worst-case Ethernet Network Latency"; IEEE 802.3 Residential Ethernet Study Group presentation; Sep. 26, 2005; pp. 1-4.

Yamaha Systems Solutions white paper, Networked Audio System Design with CobraNet, 16 pages, 2006.

* cited by examiner

METHODS FOR TRANSPORTING DIGITAL MEDIA

CROSS REFERENCE TO RELATED APPLICATION

This application is a continuation of U.S. patent application Ser. No. 13/907,171, filed May 31, 2015, which is a continuation of U.S. patent application Ser. No. 13/193,283, filed Jul. 28, 2011, now U.S. Pat. No. 8,478,856, which is a continuation application of U.S. patent application Ser. No. 12/662,994, filed May 14, 2010, now U.S. Pat. No. 8,005,939, which is a continuation application of U.S. patent application Ser. No. 11/409,190, filed Apr. 26, 2006, now U.S. Pat. No. 7,747,725, which claims priority from Australian Provisional Application No. 2005902065, filed Apr. 22, 2005, and Australian Provisional Application No. 2005906272, filed Nov. 11, 2005. Each of these applications, in their entirety, are incorporated herein by reference.

BACKGROUND OF THE INVENTION

1. Technical Field

This invention concerns the transporting of digital media packets, such as audio and video. In a first aspect the invention concerns a data network able to carry high fidelity audio. In another aspect the invention concerns a network device for sending and receiving digital media packets; such as a Digital Signal Processing (DSP) chip for public address systems. In a further aspect the invention concerns a method of operating the data network or network devices and software for performing the method, for instance, on a personal computer.

2. Background Art

Audio and video signals have long been transmitted using application specific cables. For instance two-core speaker cable is used to carry left and right audio signals from amplifiers to speakers.

The time at which a received media signals are played out by a media device is called the playout time. Typically, a media device that receives media signals will playout the media signals by rendering them in some way. For example, if the media device is a loudspeaker it will render the audio media signal into sound. If the media device is a video screen it will render frames of the video media signal onto a screen. Alternatively, if the media device is a lighting control system it will render the lighting media signal by turning a spotlight on and off.

Real time transporting of digital audio and video and other digital media over data networks creates a new set of problems compared to non-media data. For instance, data networks may use packet switching in which data is divided into packets for separate transmission. As the packets are transmitted, sequential packets may take different routes and have different transit times. The packets are numbered to ensure they can be reordered correctly after arrival. This technique, however, does not suffice when left and right audio signals are to be received at different destinations, for instance at different speakers.

Unlike non-media data, digital media must be played out in synchronisation. For example, video and audio must be aligned in time so that when they are played out the images match the sound.

The concept of a network clock has been used to address timing problems in data networks. A network clock signal is typically generated at a specific point in the network and this becomes the system time signal received by devices on the network. The system time signal is then used as a time reference for every device that receives the system time signal. Because of the topology of the network, devices at different locations on the network will receive the clock signal with a phase offset from the network clock, depending on the propagation delay from the clock to the device. A further consequence is that the different remote devices will have received clock signals that have phase offsets with respect to each other, as well as with respect to the network clock.

Digital media transmission has historically embedded clocking information in the transmitted data. Embedding and recovering clocking information from data signal transitions or packet timing (e.g. ABS3, SP/DIF, Gibson MaGIC) works well for point to point links between a small numbers of devices, but as the number of devices increases, clock jitter cascades and builds through each device that recovers and re-transmits the clocking information. Large systems employ a separate clock network to avoid such problems with clock jitter.

Digital media transmissions may alternatively employ a Time Division Multiplexing (TDM) approach. In TDM systems (e.g. MADI, CobraNet), a master clock device initiates periodic transmission cycles and each device is allocated one or more time slots within that cycle for transmission. This limits the total available number of channels.

BRIEF SUMMARY OF THE INVENTION

The invention provides a method of transporting multiple media channels over a network in a manner that meets quality and timing requirements for high quality audio and video reproduction without the need for specialised equipment, such as a separate clock network. The invention has the advantage of being able to use low cost data network cabling and equipment, such as switched Ethernet, to transport digital media.

The invention provides network devices having a local clock signal that is synchronised to a system time signal of the network for both rate and offset. Rate synchronisation helps to ensure the rate that the local clock ticks over at is the same as the rate of the system time signal. Offset synchronisation helps to ensure both the system time signal and local time signal share a common time reference point. The local clock signal governs the rate and offset of the received or transmitted media signals. Because each network device has a local clock signal that is synchronised to the system time signal, all received and transmitted media signals of the network are synchronised for both rate and offset.

Accordingly, it is a feature of this invention to provide a network and suitable devices for transporting digital media. The network includes a master clock device to generate a system time signal for the network and a plural number of network devices interconnected such that each device is able to send packets to other network devices, and to receive packets from other network devices. Preferably, each network device is also configured to receive media signals from a media device, to transmit media signals to a media device, or to do both. Typically, each network device is connected to the master clock device and uses the system time signal and a network time protocol to generate a local clock signal that is synchronised to the system time signal for both rate and offset, the local clock signal governing both the rate and offset of the received or transmitted media signals. The media packets may be audio or video, or a mixture of both.

Typically, each network device that receives media signals from a media device uses its local clock which is synchronised to the system time signal to packetise the media signals, and to timestamp the media packets with system time before sending them to another network device. In this way, media packets are generated and sent by all network devices in the network at a local rate that is synchronised to the rate of the system time signal. This helps to eliminate buffer overrun and underrun in the network. Further, the packets are timestamped with a synchronised time value. The timestamp may be the earliest system time at which the media signal contained in the packet was converted into digital form (i.e. generation time).

Each network device that receives media packets uses the packet timestamp to coordinate the media signals in time for playout. The coordination of media signals is achieved using the packet timestamps to re-order the media packets if required; and in addition to align and combine media signals received from different network devices, or to determine the appropriate playout time for media signals contained in the media packets, or both. Aligning media signals may comprise delaying the playout of one media signal with respect to another.

The appropriate playout time for media signals contained in a media packet may be different for each network device that receives the media packet. In this way, where there are multiple playout media devices, the playout time can be controlled based on the spatial location of each playout media device, so that media signals are played out by each media device is received at one particular spatial location at the same time. For, example in a rock concert the sound from the speakers on stage and in the auditorium should arrive at the audience at the same time. To achieve this, sound from the closer auditorium speakers can be delayed to allow the sound from the stage speakers to travel the extra distance through the air.

A media clock signal may be provided that is synthesized from the local clock signal. The media clock signal is able to drive conversion between analogue and digital media signals and to directly govern the rate and offset at which media signals are received or transmitted (e.g. are produced or consumed) by the network device. Because the media clock is synthesised from the local clock signal, which is in turn synchronised to the system time signal, the rate that media signals are produced and consumed is governed in a manner that eliminates buffer overrun and underrun in the network devices.

Techniques that can be applied to synthesise a media clock from the local clock signal include Direct Digital Synthesis (DDS), Digitally Controlled Oscillators (DCO) or Voltage Controlled Oscillators (VCO) controlled by a Digital to Analogue Converter (DAC). The media clock may be synthesized by using a software timer that is caused to track the synchronised local clock, to directly govern the rate and offset of the received or transmitted media signals.

The rate of the media clock signal may be different to the rate of the local clock. For example, the rate of the media clock may be a multiple of the rate at which the media signals are generated by the media device, for example a multiple of the rate at which digital audio samples are produced. Use of a network time protocol to synchronise the local time to the system time signal on the network de-couples clocking and clock synchronization from data transmission. This simplifies support for simultaneously transmitting at multiple data rates, such as 44.1 kHz/48 kHz/96 kHz audio by different media clocks, and eliminates the need to run a separate clock network to each network device. Because the media clock can derive any sample rate or frame rate it likes from the system time signal, the network as a whole is not constrained to a single sample rate. One or more media devices may be connected to a network device to generate and deliver media signals, to receive, to process and to deliver media signals, or to receive and playout media signals.

The jitter experienced by network time protocol packets is minimised by using a Quality of Service (QoS) technique. The QoS technique may operate in the network to expedite the forwarding of packets having a higher priority than other packets. For example, packets may be prioritised based on three categories. Packets that contain network time information may be prioritised over audio media packets. In turn, audio media packets may be prioritised over best effort traffic. By placing the highest priority on packets that contain network time information, the QoS scheme is able to optimise the maintenance of the timing synchronising of the network devices.

According to one embodiment of this invention, if two network devices seek to send media packets to another network device, they each may select a random start time and send media packets from their respective random start time at a regular rate. In this way, two network devices sending media signals to be played in synchronization do not cause a bottleneck in the network that would otherwise increase the jitter in the network.

The network time protocol (e.g. according to IEEE 1588) distributes absolute time from a master clock. The network time protocol may use a bi-directional exchange of messages to enable the calculation of the transmission delay between master and local slave clocks which can be used to calculate a more accurate estimate of the local clock offset. This enables the local clocks to compensate for variable network delay and achieve tighter synchronization regardless of their location in the network topology.

The network time protocol may operate to elect a master clock device where multiple possible master clock devices exist on the network. For example, in the IEEE 1588 network protocol, the best master clock and backup master clock are selected from a set of potential candidates. The backup master clock uses the IEEE 1588 network time protocol to synchronise the backup clock with the elected master clock. If the selected master clock fails, the backup master clock operates to take over by providing the system time signal for the network. Network devices that depend on a master clock can continue to operate smoothly.

Further, the network time protocol may support multiple master clock devices such that different network devices are connected to different master clocks. For example, the data network may be comprised of two distinct audio networks in different locations each having a IEEE 1588 master clock. The distinct networks may coordinate their master clocks via another mechanism, for example GPS time synchronisation. This allows the two networks to share a common notion of time and send timestamped media packets to each other.

The network may include an Ethernet network. Ethernet networks are able to support multicast transmission in which network packets are duplicated in network switches, thus efficiently supporting large numbers of receiving network devices. The network devices may be connected directly, or indirectly to the master clock. The architecture of this invention scales with increasing Ethernet bandwidth (e.g. 100 Mbit/second to 1 Gbit/second). Increasing bandwidth implies increased total throughput as well as decreased latency and jitter. A heterogeneous network combining network devices connected via 100 Mbit/sec links interconnected by 1 Gbit/sec trunks is also enabled.

The playout time for media signals must take account of network transmission delays, network time protocol synchronization errors, media clock synthesis errors, sender timer jitter and network jitter. These are all factors which may delay or produce the appearance of the delay in the receiving of media packets. The playout time of received media signals must be delayed enough to allow for late arrival of media packets due to any of these causes since if a playout time is selected that is too early, any delayed media packets containing media signals that must be played out in synchronization with the received media signals will not be available for playout when required. The media packets are buffered until their playout time in order to compensate for delays in transmission and clock synchronization errors. Each network device may include a jitter compensation buffer provisioned according to the maximum expected end-to-end delay such that there is never a buffer underrun. Media packets arriving are stored in the jitter compensation data buffer until the correct playout time arrives.

In another aspect the invention provides a data network device for connection to other network devices to transport media packets between them. The network device includes a media port to receive media signals from a media device, to transmit media signals to a media device, or both; a master clock to generate a system time signal, or a clock port to receive a system time signal; and a local clock generator to use the system time signal and a network time protocol to generate a local clock signal that is synchronised to the system time signal for both rate and offset, the local clock signal governing both the rate and offset of the received or transmitted media signals.

In use, when the network device receives media signals from a media device it may use its local clock to packetise the media signals, and to timestamp the media packets with system time before transmitting them to another network device.

In a further aspect, the invention provides a method of operating a data network device to transport media packets. The method includes steps of generating or receiving a system time signal for the network, and configuring a plural number of the network devices such that each is able to send packets to and/or receive packets from other network devices. It further includes steps of configuring the network devices to receive media signals from a media device, transmitting media signals to a media device, or both, and connecting each network device to receive the system time signal. Finally a step of operating each network device to use the system time signal and a NTP to generate a local clock signal that is synchronised to the system time signal for both rate and offset, the local clock signal governing the rate and offset of the received or transmitted media signals is performed.

The method may further comprise receiving media signals at a network device, packetising the media signals and timestamping the media packets with system time, using the device's local clock, and then transmitting the media packets over the network to another network device. The method may further comprise receiving a media packet at a network device and using the packet timestamp to reorder media packets; and, to align and combine media signals from different network devices, or to determine the appropriate playout time for media signals contained in the media packets, or both. If desired a software program can be used to implement the method as described above.

BRIEF DESCRIPTION OF THE DRAWINGS

Examples of the invention will now be described with reference to the accompanying drawings, in which.

DETAILED DESCRIPTION OF THE INVENTION

Overview of the Components of the Network

Figure 1:
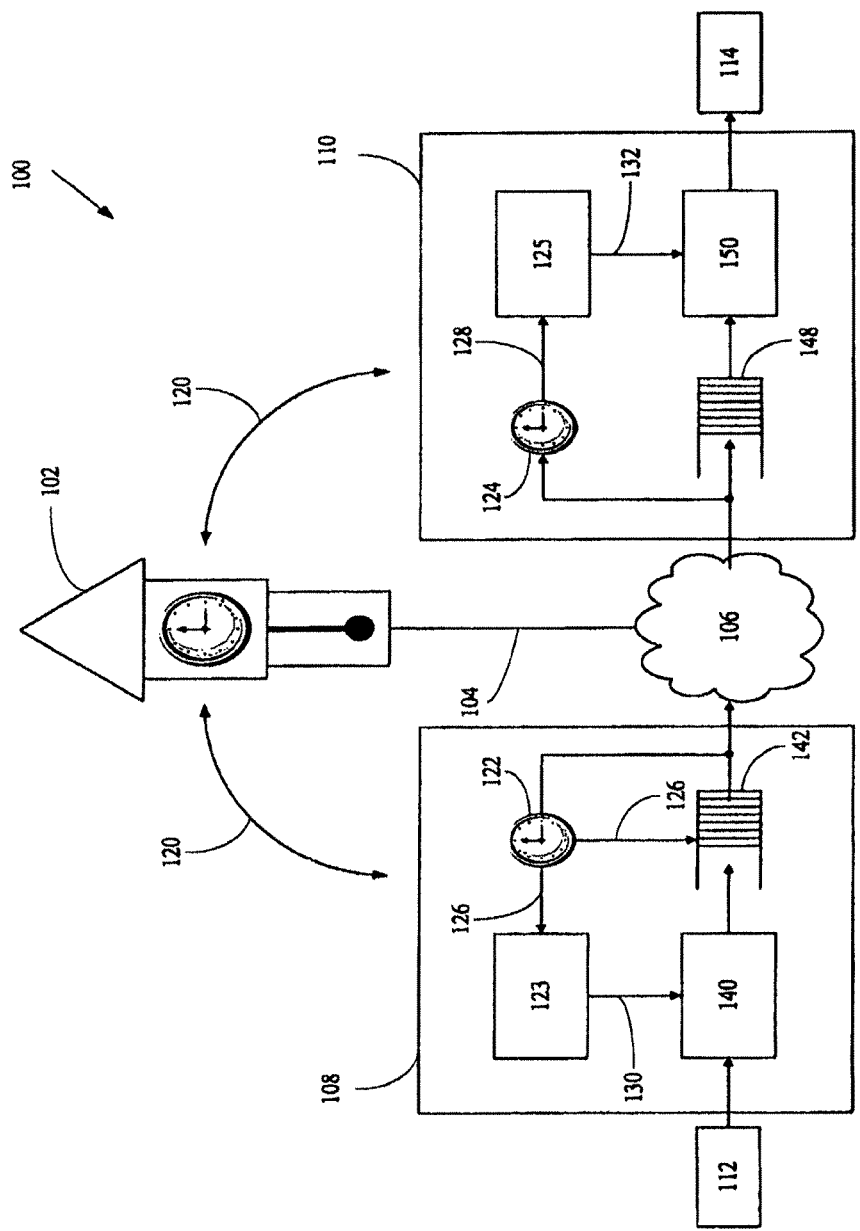
FIG. 1 is a schematic diagram of a simple network using the invention.
Figure 2:
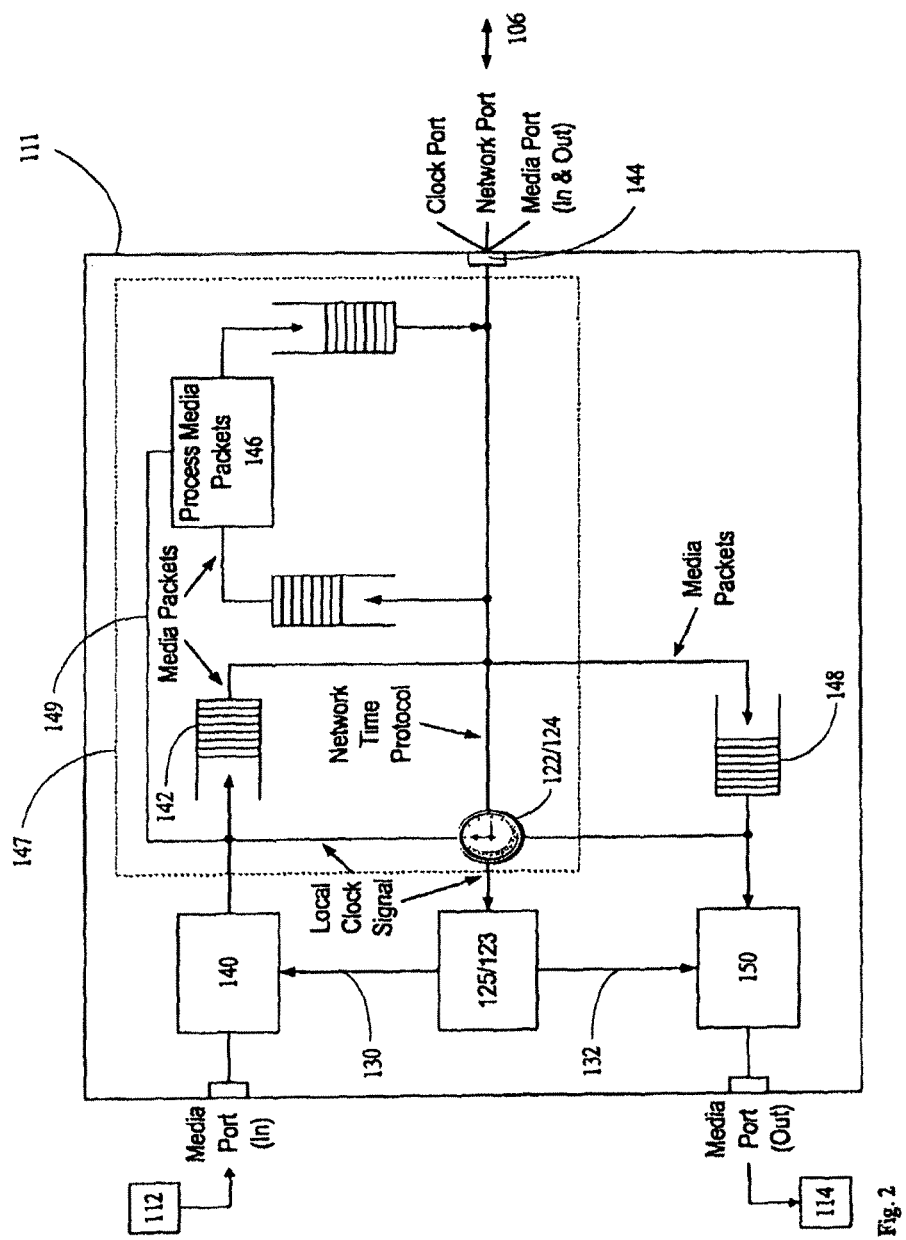
FIG. 2 is a block diagram of a network device that is able to receive, send and process media packets.

Referring first to FIGS. 1 and 2, a data network 100 comprises a master clock device 102 to generate a system time signal 104 for the network 100. Two network devices 108 and 110 are connected to each other by a network 106 so that they are able to send and receive media packets. The network devices 108 and 110 are also connected to media devices 112 and 114 respectively which are able to generate and/or playout media signals. The network device 108 is able to receive and packetize media signals to be sent as media packets over the network 106. The network device 110 is able to receive pacts and transmit media signals contained in the media packets to the media device 114. Network devices 108 and 110 each contain a local clock 122 and 124 and a media clock 123 and 125 respectively.

The network includes a network time protocol (NTP) 120. A NTP 120 is a set of network messages used to synchronise a clock of one device with a clock of another device. In this case, the local clocks 122 and 124 are synchronised with the master clock 102 using the NTP 120 and the system time signal 104. The network messages sent by the NTP 120 includes the sending of packets on the network 106 that relate to the system time. There are various known standard NTPs, for example, the IEEE 1588 Precision Time Protocol, and the IETF NTP.

Media clock signals 130 and 132 are derived (i.e. synthesized) from the local clock signals (i.e. Local TOD signal) 126 and 128 respectively. The NTP uses a bi-directional exchange of messages to enable the calculation of both clock offset and rate.

Clock rate synchronisation ensures that the rate at which the network devices 108 and 110 send and/or receive data packets is the same to within a desired accuracy. Clock offset synchronisation ensures that the time difference from the master clock 102 to the local clocks 122 and 124 is the same to within a desired accuracy. In this way any two clocks in the network have a bounded rate and offset error. Rate synchronisation also ensures that the media signal is produced and consumed by the network devices at a rate that is derived from the rate of the master clock. The derived rate of the network device may be different from the rate derived by another network device on the network. The derived rate (local clock frequency) may be related to the sample rate of the media signals that the network device is converting into packets (i.e. 256 for 48 Hz or 256 for 44.1 Hz). Rate and offset synchronisation enables the local clocks 122 and 124 to compensate for variable delays (i.e. days in the reception of media packets) and achieve tighter synchronisation regardless of the location of the network device 108 and 110 in the network 100 topology.

The synchronized local clock 122 is used to timestamp media packets with the earliest system time (that is also the local time 126) at which the media signal contained in the packet was converted into digital form by the data converter 140. Using the timestamp, the network device 110 that receives the media packet can coordinate the correct playout time for the media signals.

Overview of the Operation of the Network

In reference to FIG. 1, operation of the sending network device 108 will now be described. Incoming analogue media signals produced by the media player 112 reach the analogue to digital converter 140 of the network device 108. The rate that the analogue to digital converter 140 converts the media signal is governed by the media clock 130. The digital signal produced by the analogue to digital converter 140 is passed to a data packetise and timestamp buffer 142 for collection into media packets. The media packets are timestamped with the earliest system time at which the media signal contained in the packet was converted into digital form.

The local clock 122 supplies rate control, and offset control to the packetising and time stamping of the media packets via link 130. Since the local clock 122 is synchronised with the master clock 102, the rate that the media packets are produced is at the same rate as the system time signal 104 of the master clock 102. This will also be the same rate of the local clock 124 of the receiving network device 110 so the rate that the entire network 100 produces and consumes media packets is synchronised. The local clock 122 is also synchronised to the master clock 102 for offset. The adjustment of the local time to synchronise with the time of the master clock 102 is achieved using an offset amount. The local time offset from some epoch (e.g. seconds since 00:00:00 Jan. 1, 1970) tracks the master clock time. The packets are then passed to the network port 144 for transmission on the network 106 for delivery to the network device 110.

Operation of the receiving network device 110 will now be described. Incoming packets are received from the network 106 in a jitter compensation data buffer 148 (described in more detail below) where they are delayed to account for the maximum expected latency variation (or jitter) between the sender 108 and the receiver 110. The receiver 110 uses the time stamps of the received packets to reorder the packets if necessary. The receiver 110 may align and combine media signals received from different sources. Further, the device 110 also determines the playout time for the media signals. The media signals are then passed to the digital to analogue converter 150 for conversion to analogue at a rate controlled by the media clock signal 132 of the media clock 125. The media signal is then sent to a media device 114, for instance, for playout.

The device 111 shown in FIG. 2 is able to perform the functions of both network devices 108 and 110. Further, this network device 111 can be used for processing media signals in a digital form. In this case media packets are received from one or more senders at the network port 144 and processed within the network device 111 at processor 146. The timestamps of the received media packets are used to align the digital media signals of the packets in time, if necessary. Processing takes place to produce a new set of digital media signals (e.g. mixing a set of audio channels to a left/right stereo channel pair). This processing takes place at the rate and offset controlled by the local clock 122/124 via link 149. The new digital media signals are placed into packets and transmitted at a rate determined by the local clock signal 149 and with timestamps that are determined by the local clock offset. The processed packets are then retransmitted from the network port 144. Rather than generating a new timestamp for outgoing packets from the local clock 122 and 124, it is also possible to copy a timestamp (i.e. the offset) from an incoming packet to the outgoing packet, thus preserving the time that the media signal was originally generated. In this way, media signals can be processed purely in a computer domain by the components enclosed by 147 which may be part of a personal computer.

Any clock left to itself will tick along at a certain rate which will be slightly different for each piece of hardware. The process of disciplining a clock adjusts the rate and offset of the clock to track another reference clock (in this case the master clock 102). The process of clock synchronisation and synthesis will now be described in more detail.

Local Clock Rate Synchronization

The local clock signal 126 is a local representation of time at the network device 108. The local clock 122 and 124 is synchronised to the data network master clock 102 using the NTP 120. The local clock signals 126 and 128 are generated by a local oscillator. Even if each of the local oscillators have the same nominal frequency (e.g. 12.288 Mhz), their actual frequency (or rate) may be slightly different. In addition this rate may drift with time due to effects such as ambient temperature variations. A local clock 122 and 124 is considered synchronized to the master clock 102 if its rate is actually the same as the master clock 102 to within a desired accuracy.

The local clock signal 126 and 128 may be an electrical signal (e.g. produced by a Voltage Control Oscillator (VCO)) or it may be represented as software counters maintained by an operating system date/time facility. In all cases, the local clock signal 126 and 128 is governed (i.e. disciplined) so that it advances (ticks) at the same rate as the master clock 102.

Local Clock Offset Synchronization

The local clock signal 126 drives a time of day (TOD) clock which can be expressed as a number of seconds since an epoch. For example, Network Time Protocol version 3 (NTPv3), expresses time as two 32 bit numbers corresponding to the number of seconds and fraction of a second elapsed since 00:00:00 Jan. 1, 1900. The TOD clock is used to timestamp media packets. The epoch for this TOD clock is a global constant for the network. The availability of a global timestamp enables media signals originating from different sources to be time-aligned and combined accurately by the receiving network device 110, for example, for playout. A local clock 122 and 124 is considered to be offset synchronized to the master clock 102 if its time difference from the master clock 102 is the same to within a desired accuracy. If the time difference between master clock 102 and any local clock 122 and 124 is less than a ¼ of the sample period (5 µs for a 48 Khz signal) then any two local clocks 122 and 124 are synchronised to each other to within ½ of the sample period. This enables samples generated simultaneously at two different sources 112 to be accurately aligned for playout.

When the local clock signal 126 is an electrical signal (e.g. from a VCO), clock pulses increment a counter value which represents absolute time. The counter can be read to produce a timestamp which can be compared with timestamps from the master clock 102 (via the network time protocol 120) in a phase locked loop to achieve absolute time (offset) synchronisation in addition to rate synchronisation.

Accurate clock offset synchronization requires a network time synchronization protocol with a two way exchange of messages. This enables the local clock 122 and 124 to calculate the network delay between it and the master clock 102 and compensate for it.

Two standard network time protocols 120 which can be used with this invention are the Network Time Protocol (NTP), and the IEEE 1588 Precision Time Protocol. NTP Version 3 is widely implemented and has been documented by the Internet Engineering Task Force (IETF) in RFC1305 as an internet draft standard. Additional NTP information can be found at http://www.ntp.org/. IEEE 1588 is a published standard of the IEEE (Std 1588-2002) and is available from http://standards.ieee.org/. Additional IEEE 1588 information can be found at http://ieee1588.nist.gov/.

IETF NTP 120 is used on general purpose computer systems and can readily achieve millisecond time synchronization accuracy in a local area network. IETF NTP 120 is slave driven in the sense that a request from the slave (i.e. here the network device 108 or 110) results in a two way message exchange, which enables the slave to calculate both its time offset from the master clock 102 and the network delay.

Herein, IEEE 1588 is the preferred time synchronisation protocol 120, although many NTPs may also be used. In general, timestamping packets as close to the network transmission or reception time as possible reduces the error due to end-system jitter. Timestamping can be performed (in preference order) in hardware, in a device driver or in an application.

IEEE 1588 was designed for use with industrial control and measurement systems and is suited to accurate hardware implementation. Hardware implementations have been shown to achieve sub-microsecond time synchronization accuracy. Implementation of IEEE 1588 Border Clocks in switches eliminates the jittering of clock packets as they pass through them. IEEE 1588 uses frequent multicast messages from the master to calculate the offset. It uses a less frequent delay request message from the slave, resulting in a delay response message from the master to calculate the delay.

It may also support redundant master clocks by including a mechanism where another master clock takes over if the original master clock 102 fails. The invention can use the combination of two separate IEEE 1588 networks each having their own master clock, for example, a recording studio in Sydney, Australia and a recording studio in Melbourne, Australia. These two networks may coordinate their master clocks via another mechanism, for example GPS time synchronisation. This allows the two networks to share a common notion of time and send timestamped packets between each other.

The system may also be implemented using a set of network devices which synchronize with one master, while another set of devices synchronize with a different master on the same network, either at different times or simultaneously. As an example, a set-top box synchronized to an external video source may act as a master clock when viewing a video, whereas the amplifier in an audio system may act as the master clock for music.

The network time protocol 120 exchanges messages at a regular rate (e.g. every 1 second). By making this interval a non-multiple of media sample rates (i.e. 48 khz or 44.1 Khz) the possibility of the clock packets being encountered and being jittered by a media packet in transmission on the network 106 is minimised.

The NTP IEEE 1588 is discussed further next. In the IEEE 1588 protocol, the best master clock 102 and a backup master clock (not shown) are elected from a set of potential candidates. The elected master clock 102 may be a local clock 122 of a network device 108. The backup master clock uses the IEEE 1588 network time protocol 120 to synchronise its clock with the elected master 102. In the case that the master fails 102, the backup master takes over and other local clocks that were previously synchronised with the elected master clock 102 will now synchronise with the backup master clock and the network 100 continues to operate smoothly.

Media Clock Synthesis

Clock synthesis is a widely studied problem and various techniques can be applied to synthesise a media clock 123 and 125 from the local clock signal, including Direct Digital Synthesis (DDS), Digitally Controlled Oscillators (DCO) or Voltage Controlled Oscillators (VCO) controlled by a Digital to Analogue Converter (DAC).

A digital media signal has an implied clock. For an audio media signal, this can be the audio sample rate (e.g. 48 kHz). For a video media signal, this can be the number of frames per second. Hardware that produces or consumes digital media signals often uses a multiple of the sample rate or frame rate. For example, analogue-to-digital converters 140 commonly need a clock that is 128× or 256× the rate at which audio samples are actually produced. We term this clock multiple the media clock 123 and 125. Media clock synthesis is the process of deriving a media clock signals 130 and 132, that is a digital to analog converter (DAC) word clock, from the network time protocol 120.

At least three techniques can be used to derive a media clock: (i) directly disciplining a hardware clock from the network time protocol, (ii) controlling a pulse width modulated media clock 123 and 125 with a master clock 102 that has been disciplined by NTP/1588, and (iii) controlling a software timer from a master clock 102. These techniques are discussed next.

(i) Direct Clock Synthesis

Figure 3:
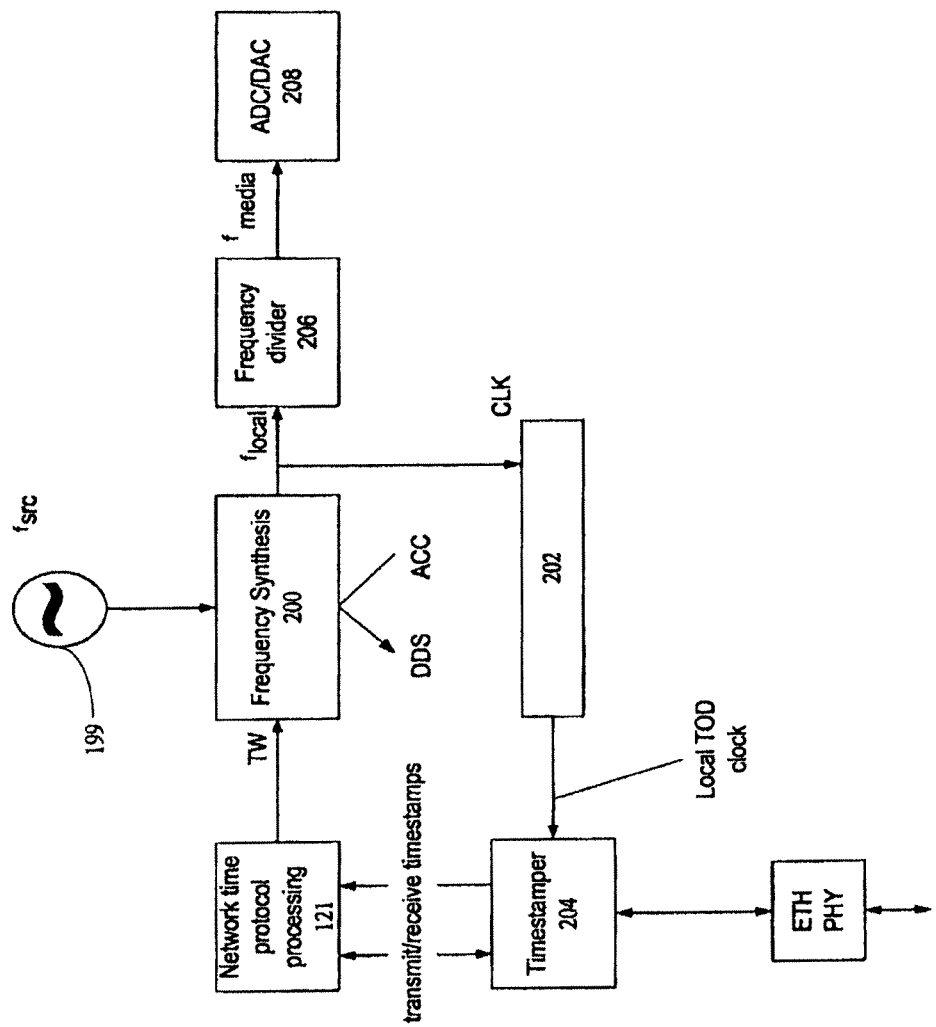
FIG. 3 is a block diagram of a programmable logic device configured for direct clock synthesis.

Direct media clock synthesis can be implemented by using a programmable logic device such as an field programmable gate array (FPGA). Referring to FIG. 3, the frequency synthesizer block 200 generates the local clock $f_{LOCAL}$ from a clock source $f_{SRC}$ 199 under the control of the network time protocol 120. The ratio of the nominal frequencies of $f_{SRC}/f_{LOCAL}$ is preferably greater than two. Preferably, either of two possible implementations of the frequency synthesis block 200 to generate the local clock frequency $f_{LOCAL}$ can be used. Both implementations use an M bit accumulator.

In a first implementation, the most significant bit (MSB) of the M bit accumulator is a square wave of frequency $f_{LOCAL}$. This waveform is jittered (i.e. delayed), however, by $1/f_{SRC}$ whenever the accumulator builds up enough phase error to output an extra pulse. If $f_{SRC}$ is selected to be an integer multiple of $f_{LOCAL}$ then these phase shifts are required only to compensate for the frequency offset from nominal and drift of the source clock $f_{SRC}$ 199. These occur at a very low frequency and while they are large, have been shown to be inaudible jitter.

In the second implementation very low jitter $f_{LOCAL}$ can be synthesized by using "Direct Digital Synthesis" (DDS). DDS involves using P significant bits of the M bit phase accumulator to address a sine wave lookup table. This is then input to a DAC 208 whose output is an analog sine wave of frequency $f_{LOCAL}$. This sine wave is filtered to remove harmonics and a comparator is used to generate a local clock with very low jitter. The frequency of $f_{LOCAL}$ can be tuned to the resolution of $2^M$.

For both implementations, the output of the frequency synthesis block 200 is the local clock $f_{LOCAL}$. This signal is used to clock an N bit counter 202. The N bit counter 202 provides the local TOD clock and is used by the timestamper 204 to timestamp sent and received network time protocol and media packets. The local clock frequency is further divided by the frequency divider 206 to generate the media clock $f_{MEDIA}$, which drives the ADC/DAC 208. Alternatively, the local clock signal $f_{LOCAL}$ could be provided directly to the ADC/DAC 208 from the frequency synthesis block. In this case there would be no separate media clock signal. Instead, the local clock signal could be used to control the rate that media signals are produced and consumed by the network device.

The method is as follows:
1. The network time protocol runs at T second intervals and calculates the offset O between the local and master clocks. This offset may be a result of both a time offset between the local and master clock, and an offset error due to a frequency difference between the two clocks. Calculate a frequency $f_{LOCAL}$ at which the local clock needs to run at over the next T seconds to compensate for this error as:

$$f_{LOCAL} = f_{LOCAL\_NOMINAL} + O/T$$

2. Calculate a phase accumulator tuning word $$TW = 2^M * f_{LOCAL}/f_{SRC}$$

where TW is the input to the M bit accumulator 200 and is added to its output every $1/f_{SRC}$ seconds. The NTP protocol time processes the network time protocol messages and uses the locally generated transmit and receive timestamps to compute an updated tuning word (TW). The tuning word adjustments may be smoothed to remove the impact of jitter in the time offsets due to network jitter by using a PLL, instead of making instantaneous adjustments.

(ii) Pulse Width Modulation (PWM) Clock Synthesis

Figure 4:
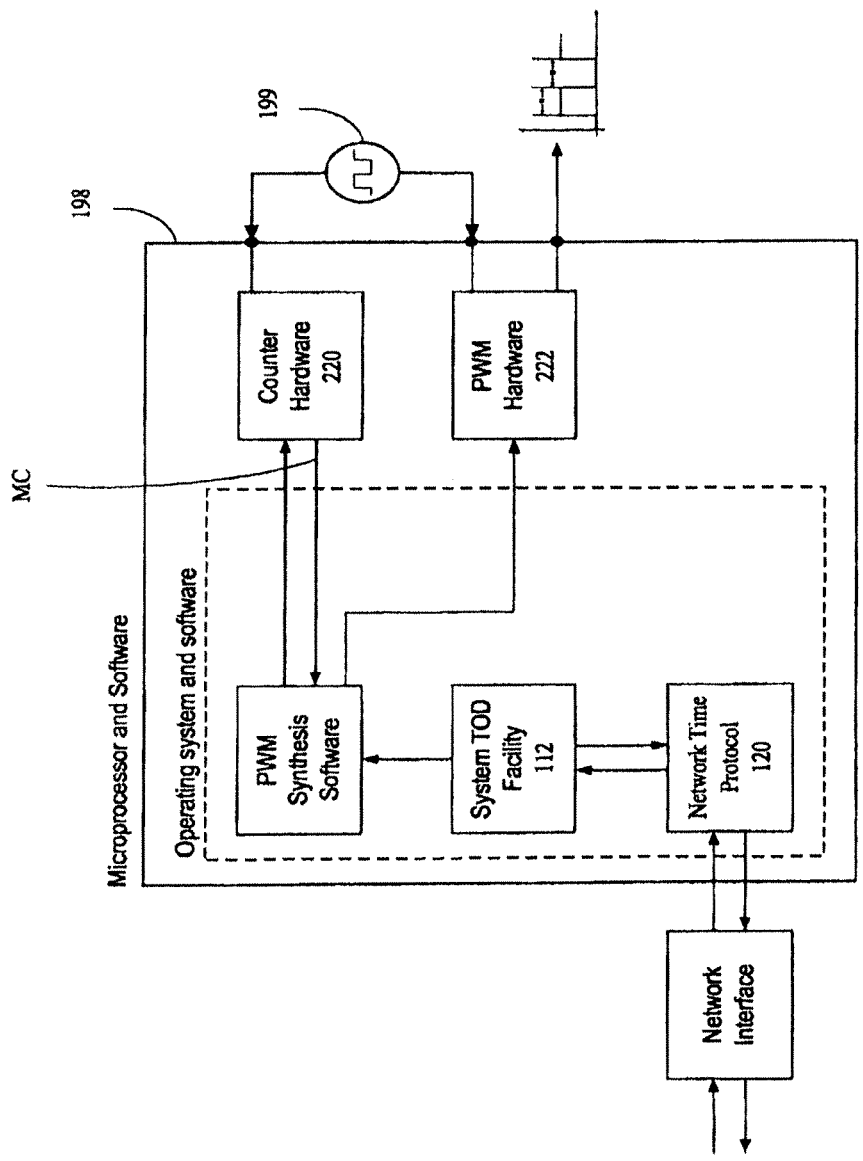
FIG. 4 is a clock diagram showing PMW modulation clock synthesis technique.

The PWM clock synthesis technique for media clock synthesis can use commercially available digital processor (DSP) chips 220 and 222 (see FIG. 4), a time of day clock disciplined by NTP or IEEE 1588 as found in many embedded operating systems, a local high frequency ($f_{SRC}$ Hz) clock source 199, a PWM counter output pin and a programmable counter that can generate interrupts every P 180 cycles of the local high frequency clock. The PWM counter can be programmed to repeatedly output logic HI for a count of M cycles of $f_{SRC}$, then logic LOW for N cycles of $f_{SRC}$.

Figure 5:
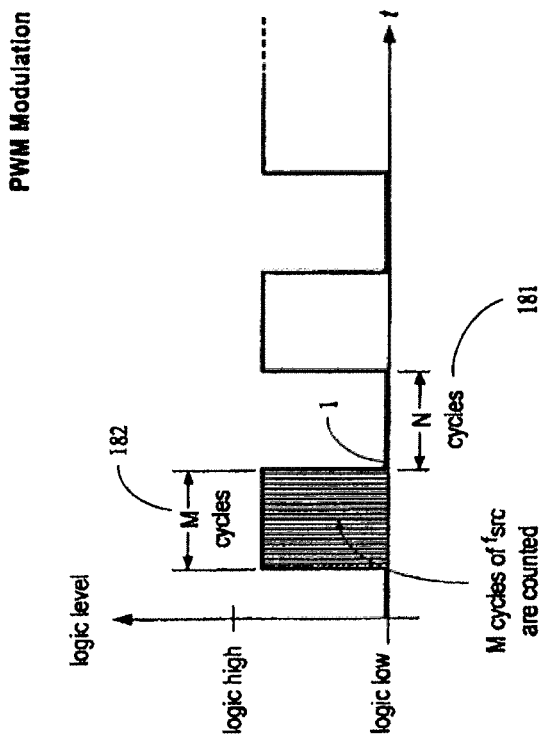
FIG. 5 is a waveform diagram showing PWM modulation.
Figure 6:
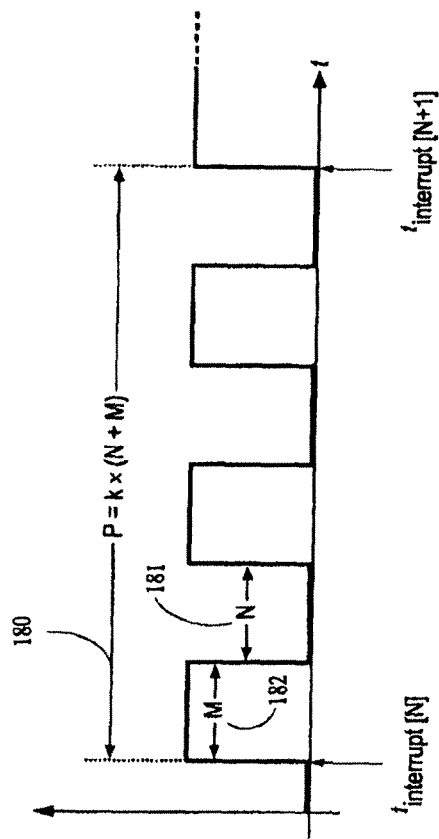
FIG. 6 is a waveform diagram showing the effect of the local high frequency clock being interrupted.

As shown in FIGS. 5 and 6, the method involves:
1. Estimate, as described above, the frequency of the local high frequency clock $f_{SRC}$ 199 using the programmable counter 220. For example, if the programmable counter generates an interrupt every P clock cycles and the system time of day clock is recorded each time an interrupt is received, $f_{SRC}$ may be estimated:

$$f_{SRC} = P/(t_{INTERRUPT[N+1]} - t_{INTERRUPT[N]})$$

2. Compute nominal PWM counter values for N 181 & M 182 that will produce a clock frequency as close as possible to the desired $f_{MEDIA}$:

$$(N+M) = f_{SRC}/f_{MEDIA}$$

3. Set the programmable counter to throw an interrupt every P=k*(N+M) cycles of $f_{SRC}$ as shown in FIG. 6. Each time this interrupt fires, the values of M 182, N 181 and P 180 are updated. For an audio system, preferably P 180 is chosen so that jitter introduced by clock adjustments is inaudible (e.g. a 1 Hz interrupt rate). Note that in each clock update period, the clock can be corrected in multiples of $k/f_{SRC}$ seconds.

4. Initialise the residual Synthesized clock error (to zero, say):

$$E_{RESIDUAL} = 0$$

5. Each time the interrupt fires:
a. Estimate the source clock rate $f_{SRC}$ as in step 1.
b. Compute new $(M+N) = f_{SRC}/f_{MEDIA}$.
c. Compute the error between the synthesized clock and the time of day clock.

$$t_{EXPECTED} = t_{INTERRUPT[N]} + k/f_{MEDIA}$$

$$E = t_{EXPECTED} - t_{INTERRUPT[N+1]}$$

d. Add computed error to residual synth clock error $$E_{RESIDUAL} = E_{RESIDUAL} + E$$

e. Amortise residual clock error over the next k periods of the media clock $$(M+N) = (M+N) + \text{quotient}(E_{RESIDUAL}/(k/f_{SRC}))$$

$$E_{RESIDUAL} = \text{remainder}(E_{RESIDUAL}/(k/f_{SRC}))$$

f. Program the PWM counter with the new values for N and M.
g. Update the value of P=k*(M+N).
h. Program the interrupt period with the new value of P.

(iii) Software-only Systems

The software-only system approach for media clock synthesis is applicable in systems that do not discipline a hardware media clock 123 and 125. A software master clock 102 is a timer implemented in software. The timer is a common feature of operating systems. An application may request to be signaled after T microseconds have elapsed, or may request to be signaled at a particular (future) TOD instant. An example is a general purpose computer sending packetised audio data coming from a file over a network. The "media clock" in these systems is the timer used to schedule the transmission of the next media packet. It will be apparent that a software timer may be caused to track the synchronized local TOD clock.

One approach for implementing such a system is:
1. T=1/fs–the period of the sample clock
   SPP=number of samples per packet (e.g. 10)
   Record a start time $t_{START}$=Read–TOD–current–value( )
   Initialize a packet counter $n_{PKRS}$=0
2. Set timer to fire in $S_{PPT}$*T seconds from now
3. [TIMER FIRES]
   Send a packet with $S_{PP}$ samples of audio data
   $n_{PKTS} = n_{PKTS} + 1$
   $t_{EXPECTED} = t_{START} + n_{PKTS} * S_{PP}$
   $t_{NOW}$=Read–TOD–current–value( )
4. Set timer to fire in $S_{PP}*T - (t_{NOW} - t_{EXPECTED})$ seconds from now
5. Back to step 3 when the tuner fires.

In many systems, software timers are not always guaranteed to arrive promptly. If such a software timer arrives late, packets may have not been sent because the timer signal did not arrive. In this case the system "catches up" by sending the packets that were not sent. It will be apparent that a system in which timers may fire later than one packet-time from when they are scheduled to arrive will need to send additional packets at step 3 from time to time to catch up after late timer arrivals.

Media Clock Offset Synchronisation

Media clocks offset synchronisation is achieved by:
1. counting ticks of the media clock since a nominated start time,
2. periodically computing a media clock absolute time (T=start-time+N*media_clock_period),
3. comparing the media clock absolute time with the master clock time to produce a time difference, and
4. increasing or decreasing the media clock frequency to minimise the time difference.

A wide variety of known phase locked loop techniques may be employed to increase or decrease the media clock frequency and so implement this control loop. The process of counting media clock ticks since a designated start time assigns an absolute time to each edge of the media clock and the control loop acts to ensure that the media clock edges are aligned with the master clock.

To illustrate, the counter 202 in FIG. 3 counts pulses of $f_{LOCAL}$ (a multiple of $f_{MEDIA}$). This count in combination with a start time is used to produce a local TOD clock. Timestamps taken using the local TOD clock are then compared to timestamps from the master clock in the network time protocol messages 121 and the difference used to update the DDS tuning word (TW) 200 thus varying media clock frequency and offset.

Jitter Constraining QoS Scheme

Further to clock synchronisation, a QoS scheme can be used to control overall jitter and delay in a network. Typical components of a media networking QoS scheme technique used for this invention include:

1. Classification of Packets According to Priority

This can be implemented by inspecting packet fields (e.g. 802.1Q priority bits, IP Diffscry Code Point, UDP or TCP port numbers) set by the source. Packets not labeled with a priority value are classified as "best effort" traffic.

2. Expedited Forwarding of High Priority Packets

In this approach, high priority packets are transmitted preferentially, minimizing the time they spend queued in switches of the network 106. Various mechanisms are commonly available including "Strict Priority" and "Weighted Fair Queuing" scheduling. A source may also implement a priority scheduler whereby it ensures that high priority packets are transmitted preferentially.

3. Preventing Over-subscription of the Network Using Admission Control

To ensure a given upper bound for jitter and to ensure that the network is operated within total available capacity, bounds on maximum network utilization of each traffic class are enforced. Clients may use a signaling protocol such as RSVP to discover whether the network will support additional network flows before transmitting packets into the network. In simple network topologies where a network of switches is connected via an over-provisioned backbone, the link between the client and the next hop switch is the bottleneck. In this case the client may perform a local admission check without needing to use hop by hop RSVP signaling Three approaches for QoS techniques in a network transmitting digital audio data are:

1. Three levels of priority—no NTP/1588 support in the switch.

Highest Priority: network time protocol traffic (NTP/1588)
   Middle Priority: packets containing digital audio data
   Lowest Priority: best effort traffic Expedited forwarding is enabled using Weighted Fair Queuing or Strict Priority. Highest priority clock packets may still experience some jitter due to queuing behind low priority packets already in transit in a switch. While filtering of jittered packets can be used to improve performance, this reduces the clock synchronization accuracy achievable. The network diameter (maximum number of hops) is typically restricted to stay within desired clock synchronization accuracy, end-to-end latency and accuracy of sample alignment in the network. This may only be required for certain critical paths of the network with laxer timing requirements being acceptable on other paths. The bandwidth requirement for an audio stream can be calculated knowing its bit depth and sample rate. The admission control mechanism is used to ensure that the bandwidth required by the sum of all streams traversing any particular network link does not exceed the link capacity.

2. Two Levels of Priority—1588 Border Clocks in Switches

If the network switch supports the IEEE 1588 network protocol, it will consume and regenerate the network time protocol packets rather than forwarding them. In this case, only two priority levels are needed:

Highest Priority: packets containing digital audio data
   Lowest Priority: best effort traffic Expedited forwarding is enabled using Strict Priority or Weighted Fair Queuing. The bandwidth requirement for an audio stream can be calculated knowing its bit depth and sample rate. The admission control mechanism is used to ensure that the bandwidth required by the sum of all streams traversing any particular network link does not exceed the link capacity.

3. Over-provisioned, Audio-only Network.

For networks with few devices, few audio channels and constructed using high speed links, such as a set of devices connected to a single gigabit Ethernet switch, the network has more capacity than is required. Provided the network is only carrying audio and network time protocol traffic, priority schemes, expedited forwarding and admission control are not necessary. This is because the network is so lightly loaded that it does not introduce significant jitter.

The above list-of QoS schemes for transmitting digital audio data is not exhaustive, and may be extended to support video traffic or multiple classes of audio traffic with different latency requirements by adding additional priority levels.

Playout Time

Receivers 110 compute a playout time by adding a latency time interval, compensating for network jitter and timing errors, to the source timestamp. The additional latency required can be easily measured at each receiver 110 by examining the incoming timestamps from each distinct source to the local clock 124. Pre-recorded data can be sent early, relying on the receiver to use the timestamp to compute the correct playout time. Sequences of event based data, such as MIDI or lighting control commands, can be supported.

An appropriate playout time can be represented as NOW+D. The value for D can by estimated by recording the worst case difference between the time at which a packet was received, as measured by taking a timestamp using the local clock at the instant the packet arrives, and the timestamp placed in the packet by the sender 108.

Pre-recorded audio data, or event sequences can be sent with a timestamp in the future, enabling them to be buffered by the receiver 110 until the playout time arrives. For example, consider lighting control. The message TURN_ON can be sent to three different lights, one after the other, with the same timestamp, 1 second in the future from now. Each light will buffer the message until the playout time arrives, and although the messages were sent at different times, the lights will all turn on at the same time. In another example, a sequence of TURN_ON messages can be sent to a light with a timestamp of NOW+1s, and immediately another message is sent with a TURN_OFF message to the same light, but with a timestamp of NOW+10s. The light processes each message when the playout time arrives, turning the light on for 9 seconds at one second after the messages were sent. In this example, the lighting control messages are sent "early," with timestamps in the future.

Jitter Compensation Data Buffers 142 and 148

The playout time for a particular packet must take account of network transmission delays, network time protocol synchronization errors, media clock synthesis errors, sender timer jitter and network jitter. The playout time of received packets must be delayed enough to allow for late arrival of packets due to any of these causes. The length of the jitter compensation buffer 148 must be provisioned according to the maximum expected end-end delay between that sender 108 and receiver 110 such that there is no buffer underrun.

Packets arriving are stored in the jitter compensation data buffer 148 until the playout time arrives.

For example, if packets may be delayed by at most D microseconds traveling between the source and a receiver, the system can safely choose a playout time of NOW+D microseconds. The packets that are received between NOW and NOW+D are stored in the buffer to ensure that by the time NOW+D arrives, all delayed packets have been received. Playout of each packet occurs at D microseconds after the timestamp it contains.

Each receiver 110 will independently determine an appropriate playout time for audio from a particular sender 108. Under system control, two receivers 110 may choose to synchronize their playout times. For example the right and left channel in a home stereo would choose the same playout time for the right and left channel sound to be synchronized. Receivers 110 in different parts of the network also may choose differing playout times. For example in a live concert, the delay from the performer to the speaker providing the musicians mix is critical, thus the network would be designed (i.e. by ensuring that high speed links are used and that the number of switch hops is minimised) such that the network delay in this path is minimal and the speaker uses an earlier playout time. On the other hand, the delay to the reinforcement speakers in the hall is less critical and may involve more network hops. These receivers could use a later playout time than the musicians speaker. In addition, arrays of reinforcement speakers in a hall could also select different playout delays selected such that the phase relationship between them makes for optimal listening.

Source timestamps can also be used to align and combine data from different sources even when the delays through their respective network paths to the receiver are different, for instance in audio mixing. Audio playout may also be synchronized with non-streaming data such as MIDI by aligning the timestamps in the MIDI data with the timestamps in the audio data. This same approach applies for any timestamped media, video, lighting control. A given receiver 110 may pick different playout times for each audio channel as described above. If the system is minimising the latency through the network 100 for each audio channel independently, then the delay (D) can be estimated for each channel and the playout time NOW+D can be calculated for each channel separately. The above functionality is not possible if the audio packets are timestamped with a playout time, rather than the generated time.

An implementation on a general purpose computer system requires a jitter compensation latency of the order of 5-10 ms, primarily due to timer jitter in the sending system and NTP synchronization errors. The minimum jitter compensation latency for a tightly synchronized system (e.g. a hardware implementation using IEEE 1588) is one packet interarrival time—just as the current packet is consumed, the next packet arrives.

Since media packets are generated at regular intervals, if all sources connected to a switch generate a packet at the same time, they would be passed through the switch as a bunch. If this bunch of packets then encounters a similar bunch of packets at the next switch hop, then the latency through a switch would increase at each hop. To avoid this effect sender 108 randomises start times and thereafter generate packets at a regular rate with respect to this random start time at the governed rate. This helps to reduce bottlenecks in the network 106.

More than one sender 108 is able to send packets over the network 106 at any given time—in keeping with the usual mode of operation of packet switched networks like Ethernet.

The maximum network latency encountered by audio packets between any sender 108 and a receiver 110 may by bounded by using well understood Quality of Service (QoS) techniques. These include using admission control to limit the number of audio streams on each link as well as deploying scheduling techniques in switches to prioritise audio packets over other non-real time data as discussed above. Therefore a system with tight clock synchronization with network QoS should be able to achieve a smaller end-to-end latency than a system with looser clock synchronization and no QoS. An implementation on a general purpose computer system requires a jitter compensation latency of the order of 5-10 ms which is primarily due to timer jitter in the sending system and NTP synchronization errors.

The architecture of the invention also supports non-streamed data that requires time synchronization. Examples are MIDI and lighting control, as discussed next.

EXAMPLE

Figure 7:
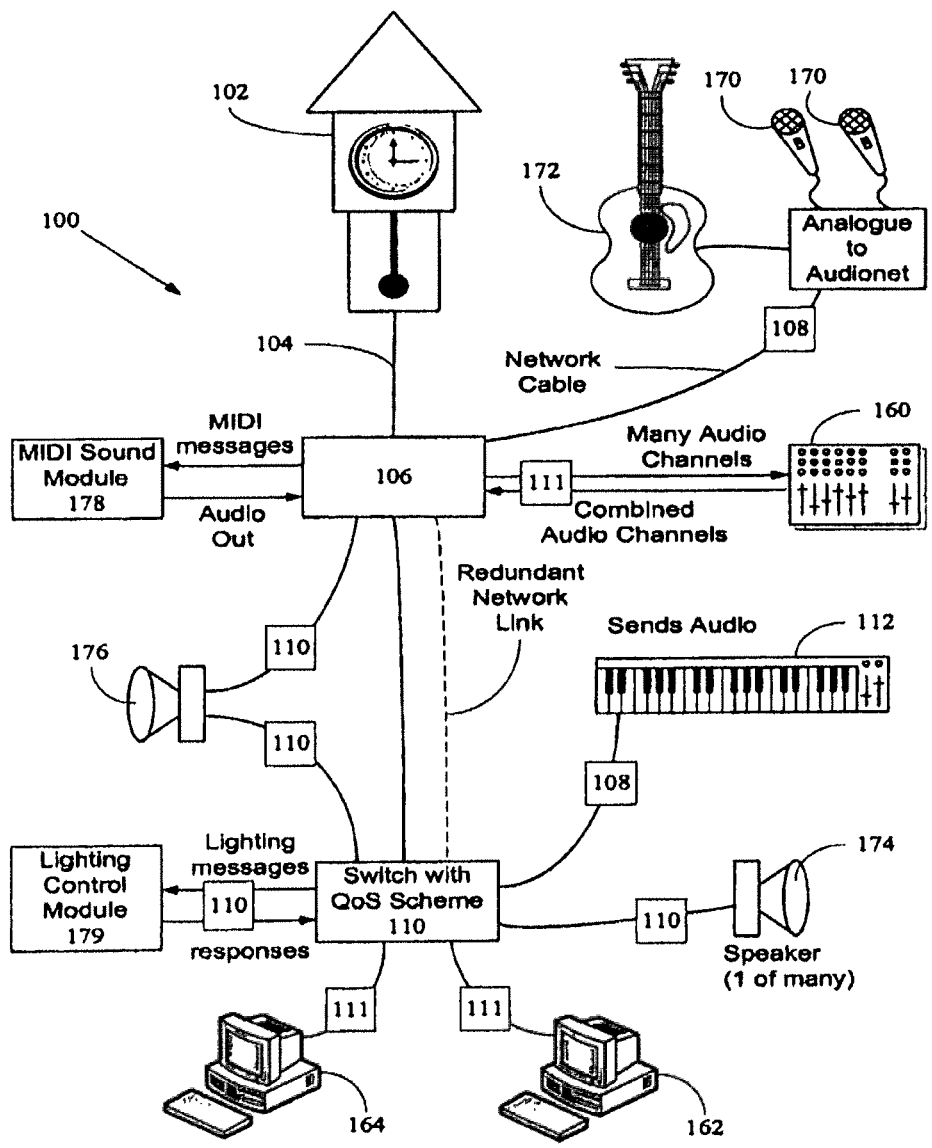
FIG. 7 is a block diagram of a typical implementation of the invention.

FIG. 7 is a block diagram of a typical application of the invention. The master clock device 102 produces a system time signal 104 which is relayed to the network devices 108, 110 and 111. These network devices may be connected to a variety of media devices 112 and 114 as shown here, or alternatively they may be incorporated into the media device. Some of the media devices may be digital sources 112 or analog sources microphones 170 and a guitar 172. Others may be audio playout devices 114 such as speakers 174 and the redundant speaker 176. Still others may be media processing devices such as a MIDI sound console 178, a mixer 160 or a lighting control module 179. A computer 162 may be used to record and send audio, and also to send MIDI and lighting command signals. Another computer 164 may be used as a configuration console for the network 100.

The invention supports a wide range of application domains from low cost devices with lax timing requirements, such as audio distribution in an airport, to professional audio production systems requiring multi-channel sample accurate timing. Further suitable applications of the invention include public address system, live music systems, recording studios including professional and home recording studios, and home theatre systems.

Advantages of the Invention

Reduced Cabling Costs—

Using this invention, each cable of the network is able to carry multiple channels, which leads to reduced cabling complexity and cost. Further, the cables may contain a mix of different speed links, such as low speed device links and a highspeed backbone. A simple interface on a computer may be provided for equipment needing many channels, providing reduced setup tune, including plug and play connection.

The "audio snake" is a common component in audio systems. It is a bundle of audio cables wrapped in a sheath and is terminated with a sprout of connectors or a patch bay. There is a one-to-one correspondence between sockets on the patch bay and connectors in the sprout. An audio snake is an expensive cable due to the high cost of the connectors and the labour involved terminating the many wires. Using Ethernet vastly reduces the cabling cost and reduces the number of connectors.

Speaker cabling carries high-power audio signals. Speakers are fairly low impedance devices (typically 4 or 8 Ohm) and high cable impedances cause power losses and changes the frequency response of the speaker. Every meter of cable in a long run adds to the cable impedance. Low impedance speaker cable is thick and expensive. The closer the power amplifier is to the speaker the lower the losses. Placing the power amplifier inside the speaker is increasingly common, but requires power and the audio signal to be routed to every speaker. Digital audio networking as used by the invention is a scalable way of routing audio sources to powered speakers.

Easier Maintenance—

Using the invention, moving a piece of equipment from one network port to another port does not require audio routing configuration to be changed. This is in contrast to audio networking solutions where audio routing is configured hop-by-hop at each "switch." Changing the location of a device in such systems involves either re-cabling to make it appear that the device is still in the old location, or reconfiguring the "switches" to send the audio to the new location, rather than the old location. The "switches" in such systems do not conceptually route packets (e.g. as an Ethernet switch would do), rather they route audio channels.

Producing an audio track is not a set and forget affair. A sound engineer at a mixing console adjusts the levels of each instrument, fades between different tracks and adjusts effects during each track to get the best combined sound from the recorded sources. These adjustments can be considered part of the final performance. Recording and replaying the actions of the audio engineer avoids tedious repetition and reduces errors. An audio network facilitates the transport of automated or recorded mixing commands to equipment attached to the network (e.g. equalisers, effects processors).

Scalability—

At least one embodiment of the invention provides a multicast network architecture that can be scaled to thousands of receivers, supporting large venues like sporting stadia.

Flexibility—

The invention may be implemented in a variety of different situations as described above. This includes, high quality hardware implementations that require low latency and sample accurate timing. Sample accurate timing is the capability of two (or more) devices attached to a network to play out an audio sample at the same time—to thin a single sampling period of the digital audio. For example, left and right speakers must play out audio in synchrony otherwise poor sound reproduction will occur. Sample accurate timing ensures that digital audio data from the left and right channels having the same timestamp will be played out the left and right speakers at the same time, to within the time period for a single sample. Samples with the same timestamp will be "aligned in time" at the moment they are played out on all devices connected to the network. At the highest sample rates supported by audio systems today (192 kHz), this translates to a time synchronisation accuracy of about 1 microsecond. On the other hand cost-conscious software implementations with relaxed timing can still send and receive audio data into the network.

Allowing Different Audio Mixes—

The invention has applications in situations where there are different audio mixes coming from different speakers, such as "Audience Mix" and "Musicians Mix." For example, musicians performing live (e.g. a rock band) commonly use amplification to boost the level of sound for the audience. The "Audience Mix" is an audio signal containing all of the instruments and vocals which is played out the speakers to the audience. The "Audience Mix" is sometimes called the "Front of House" mix. The musicians, however, also need to hear themselves clearly to play well. The "Musicians Mix" is the audio signal amplified and played out the speakers pointing at the musicians on stage. Often, each musician has an individual speaker and mix in which their instrument is louder than the others. Using the invention a tenfold increase in bandwidth leads to a tenfold decrease in latency, and a tenfold increase in the number of channels.

By using networks such as Ethernet networks, the invention allows direct interfacing with computer equipment. Standard computers can participate in the network timing protocol and remain in synchronization with other devices in the network. Use of UDP/IP for audio data encapsulation allows interfacing with computer systems. Using the computer interface moving a piece of equipment is also simplified.

In traditional systems, each digital audio link type has a different data format, different cabling and different plugs. The result is that audio equipment usually has a variety of different connectors and plugs to transport the same basic PCM encoded audio data. Each component of an audio system must have an intersecting set of connectors with another component in the audio system. Each component in the system usually needs to be configured with basic information like sample rate and bit depth. Digital audio networking as used by the invention provides a way of transporting audio streams of different types over a common network. Further, the same network can be used for transporting network time information.

Support for MIDI Data—

The Musical Instrument Digital Interface is referred to as MIDI. Pressing and releasing keys on an electronic piano generates MIDI messages describing the pitch, duration and velocity of each note played. MIDI is a popular interconnection technology now used in areas other than instrument control. Today it is used to control audio effects units (reverberation, equalisation, etc), lighting equipment, and for configuration parameters for musical equipment. This invention supports the transmission of event data, like MIDI, over a single audio network.

Accurate Timing for MIDI—

The MIDI standard specifies a 31.25 kbaud/second serial cable supports 16 channels. Low bus bandwidth has two effects: first it limits the number of control events that can be sent, and second, the timing of simultaneous events is impaired as the bus load increases. These two issues are routinely avoided by using multiple MIDI busses.

Precise timing of MIDI events output from each port is achieved by clock synchronisation between the PC and the MIDI box, and by embedding timing information in the MIDI events traveling over, e.g. a USB bus. A digital audio network can replace the USB bus, and can further directly transport MIDI events to the devices that consume them with accurate timing.

Timing Errors—

Timing errors can result in phase errors in audio output. The human ear is highly sensitive to phase errors and can detect changes in sounds produced by timing errors of less than a millisecond. The invention supports precise time timing for MIDI and audio data allowing tight synchronisation to be achieved.

Peer-to-Peer Capability—

Current audio systems are centralised. All source audio data is usually routed to a mixing desk, processed and then provided to speakers. A peer-to-peer audio network architecture removes the requirement for a centralised mixing desk—audio sinks can locate and consume audio data directly.

A peer-to-peer digital audio network architecture also makes recording of digital audio data simpler. A recorder can locate and sink all sources of audio data in the network. This is enabled for a standalone recording device or PC-based audio production software.

Data networking technologies focus on error free reliable communication. As an example, Ethernet boasts high bandwidth, low bit error rates and low cost cabling. In addition, robustness against component failure is important in critical communication systems. A wide variety of protocol techniques for failing over between redundant links and services are available.

Although the invention has been described with reference to particular examples and applications it should be appreciated that it may be put into effect in many other forms and for many other applications.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A data network suitable for transporting media packets, the network comprising:
    a master clock device to generate a system time signal for the network;
    a plural number of network devices interconnected such that each network device can send media packets to other network devices, and to receive media packets from other network devices;
    wherein each network device also being configured to receive media signals from a media device, to transmit media signals to a media device, or to do both and wherein at least one network device is configured to receive and transmit media signals to a media device; and
    wherein, each network device is coupled to the master clock device and uses the system time signal and a network time protocol to generate a local clock signal synchronised to the system time signal for both rate and offset, the local clock signal governing both the rate and offset of the received or transmitted media signals.

2. A data network according to claim 1 wherein, in use, each network device that receives media signals from a media device uses its local clock signal to packetise the media signals, and to timestamp the media packets with system time before transmitting them to another network device.

3. A data network according to claim 2 wherein the timestamp of a media packet includes the earliest system time at which the media signal contained within the media packet was generated.

4. A data network according to claim 1 wherein each network device that receives media packets uses the packet timestamps to reorder media packets as required, and in addition to perform at least one of (1) to align and combine media signals received from different network devices, and (2) to determine the appropriate playout time for media signals contained in the media packets.

5. A data network according to claim 4 wherein the appropriate playout time for media signals contained in the media packets is different for two network devices that receive the media packets.

6. A data network according to claim 1 wherein the media packets contain at least one of audio and video media signals.

7. A data network according to claim 1 wherein the network comprises an Ethernet network.

8. A data network according to claim 1 wherein a media clock signal is synthesized from at least the local clock signal, such that the media clock signal directly governs the rate and offset at which media signals are received or transmitted.

9. A data network according to claim 8 wherein the rate of the media clock signal of a network device is different from the rate of a media clock signal of another network device.

10. A data network according to claim 8 wherein the media clock signal is used for conversion between analogue and digital media signals.

11. A data network according to claim 8 wherein the media clock signal is synthesized by one of pulse width modulated clock synthesis involving a pulse width modulated counter, direct digital synthesis, a digitally controlled oscillator, a voltage controlled oscillator controlled by a digital to analogue converter, and a software timer caused to track a synchronized local clock signal.

12. A data network according to claim 1 wherein the rate of the local clock signal of a network device is different from the rate of a local clock signal of another network device.

13. A data network according to claim 1 wherein at least one media device is connected to a network device for carrying out at least one of (1) to generate and deliver media signals, (2) to receive, to process and to deliver media signals, and (3) to receive and playout media signals.

14. A data network according to claim 1 wherein a quality of service scheme of the data network operates to prioritise the transmission of packets that contain network time information.

15. A data network device for connection to other network devices to transport media packets between them, the network device comprising:
    a media port for receiving media signals from a media device and transmitting media signals to a media device;
    a clock port coupled to receive a system time signal; and
    a local clock generator coupled to use the system time signal and a network time protocol to generate a local clock signal synchronised to the system time signal for both rate and offset, the local clock signal governing both the rate and offset of the received or transmitted media signals.

16. A method of operating a data network device to transport media packets, comprising the steps of:
    generating or receiving a system time signal for the network;
    configuring a plural number of the network devices such that each is able to perform at least one of (1) sending packets to other network devices, and (2) receiving packets from other network devices;
    configuring the network devices to perform receiving media signals from a media device, and transmitting media signals to a media device;
    connecting each network device to receive the system time signal; and,
    operating each network device to use the system time signal and a network time protocol to generate a local clock signal synchronised to the system time signal for both rate and offset, the local clock signal governing the rate and offset of the received or transmitted media signals.

* * * * *